Jan. 28, 1936.  T. R. SCOTT ET AL  2,029,038

ELECTRIC CABLE

Filed April 6, 1932

INVENTORS
THOMAS R. SCOTT
THOMAS E. D. MENZIES
BY
ATTORNEY

Patented Jan. 28, 1936

2,029,038

UNITED STATES PATENT OFFICE 2,029,038

ELECTRIC CABLE

Thomas R. Scott and Thomas E. D. Menzies, Aldwych, London, England, assignors to International Standard Electric Corporation, New York, N. Y., a corporation of Delaware Application April 6, 1932, Serial No. 603,471
In Great Britain June 18, 1931

5 Claims. (Cl. 173—266)

This invention relates to cables for electric power transmission and more specifically to cables of this type which employ an oil impregnated dielectric.

In these cables it has been suggested heretofore to prevent the distortion of the cable parts due to thermal expansion by means of tubes or envelopes in or adjacent the dielectric adapted to accommodate the excess of oil during expansion and to expand on cooling to fill out the spaces left by the contracting fluid.

In these compensating devices the expanding or contracting of the tubes or envelopes was invariably effected by the difference in pressure between the inside and the outside of the envelopes.

According to this invention there is provided a temperature controlled fluid pressure equalizer for an electric power cable.

According to a feature of the invention there is provided, in a fluid impregnated dielectric, a device having a negative temperature co-efficient of cubical expansion. Thus a fluid impregnated dielectric may house a device which compensatingly contracts as the pressure in the cable increases due to the heating of the parts. A device of this character may be constituted by a plurality of metallic walls together forming an enclosed envelope. The structure of one or more of the walls may be bi-metallic, comprising metals or alloys having different co-efficients of thermal expansion so that a change of shape of the device follows any change in temperature. By suitably shaping the device it may be arranged that a change in shape produces a change in the volume occupied by the device, such change in volume being much greater than that due merely to the normal expansion or contraction of the material used and in general in the opposite direction.

Figure 1:
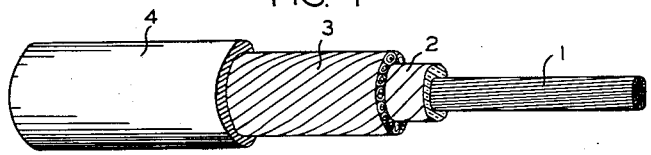
Figure 2:
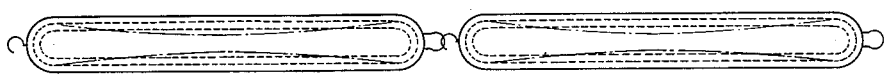
Figure 3A:
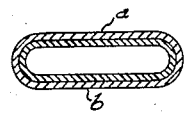
Figure 3B:
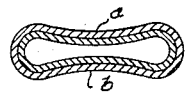
Figure 4A:
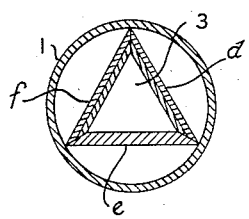
Figure 4B:
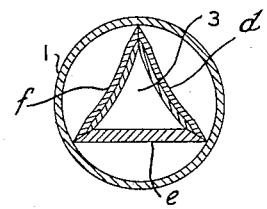

The invention will be more fully described with reference to the accompanying drawing of which Fig. 1 illustrates a cable having compensating envelopes according to the present invention. Figure 2 illustrates in detail a particular form of bi-metallic envelope. Figures 3A and 3B show cross-section views of a bimetallic tape in a normal and expanded condition respectively. Figures 4A and 4B show cross-section views of a modified form of compensating device in a normal and expanded condition respectively, mounted inside a hollow conductor.

In Figure 1 a conductor (1) has applied about it a body of insulation (2) surrounding which is a plurality of bi-metallic envelopes (3) spirally laid. These bi-metallic envelopes may take the form of hollow tapes as shown in Fig. 3A. The usual lead sheath (4) is provided. The cable is impregnated with insulating oil or compound in known manner. Although the layer of bi-metallic tubing is shown in this embodiment as occupying a position outside the insulation it will be appreciated that it may be arranged in any other convenient position in relation to the insulation (e. g. between the conductor and the insulation). Bi-metallic tubing may also be used as an intersheath in addition to its normal function of fluid pressure equalizing.

In Figure 2 a bi-metallic hollow tape is shown formed in links, the full and dotted lines indicating the normal or cold condition, and the dot dash lines indicate the way in which the walls of the envelope distort on temperature increase. The walls of each envelope are of a bi-metal with the metal having the greater co-efficient of expansion on the inside.

On heating of the cable with consequent expansion of the fluid dielectric there would be distortion of the cable parts unless space were provided for accommodating the expanded fluid. The bi-metallic strips distort to provide accommodation for the surplus fluid so that no undue distortion in the other parts of the cable can take place.

Where the bi-metallic envelopes are in continuous form as illustrated in Figure 1 they may be constituted as shown in Figure 3A. In this figure the two dissimilar metals forming the walls of the envelope are indicated at $a$ and $b$ and Fig. 3B shows the position taken up by the walls when subjected to an increase in temperature.

In Figure 4A the bi-metallic compensating device (3) is mounted at the interior of a hollow conductor (1) which is oil filled. In this case one or more of the walls $d$, $e$, $f$ may be bi-metallic and assuming that $d$ and $f$ are so made, Fig. 4B shows the shape taken on heating.

It will be appreciated that the compensating envelopes may take one of a number of possible shapes.

The metals used in the construction of the bi-metallic strip may be any having appropriate co-efficients of thermal expansion. For example, they may be of aluminium and brass. Furthermore, it will be understood that although the term bi-metallic has been used, any suitable combination of metals giving the same effect may be used, for example, an arrangement of three metals having different co-efficients of expansion might be used.

It will be appreciated that instead of the bimetallic envelope arrangement any other temperature controlled fluid pressure equalizer may be used.

What is claimed is:

1. An electric power cable having a fluid impregnated dielectric and a device having a negative temperature coefficient of cubical expansion arranged within the cable to compensate for changes in volume of said fluid dielectric due to change of temperature.

2. An electric power cable having a sheath, a conductive core, oil and a temperature controlled pressure equalizing device in contact with the oil within said sheath, said device having the form of a triangular shaped tube and so located relative to the oil as to automatically contract in volume in response to a rise in temperature thereby to permit an increase in volume of oil without a substantial increase in pressure.

3. An electric power cable having a sheath, a conductive core, fluid insulating means and a fluid pressure equalizer in contact with said fluid insulating means within said sheath, said equalizer being so located relative to the fluid insulating means and having a wall thereof so constructed as to automatically contract upon a rise in temperature and thus reduce the volume of the equalizer thereby to permit an increase in volume of said fluid insulating means without a substantial increase in pressure.

4. An electric power cable having a sheath, a conductive core, a fluid dielectric and a fluid pressure equalizer in contact with said dielectric within said sheath, said equalizer comprising a plurality of hollow strips and so located relative to said dielectric and constructed of such material that the hollow strips automatically contract in volume in response to a rise in temperature thereby to permit an increase in volume of the dielectric without a substantial increase in pressure.

5. An electric power cable having a sheath, a conductive core and a fluid dielectric within said sheath, and means, also within said sheath and in contact with said dielectric which when subjected to an increase in temperature automatically contracts in volume permitting an increase in volume of the dielectric without a substantial increase in pressure.

THOMAS R. SCOTT.
THOMAS E. D. MENZIES.